Aug. 27, 1929.   P. FOWLER   1,726,145
POTATO SEED CUTTER
Filed June 20, 1928   2 Sheets-Sheet 1
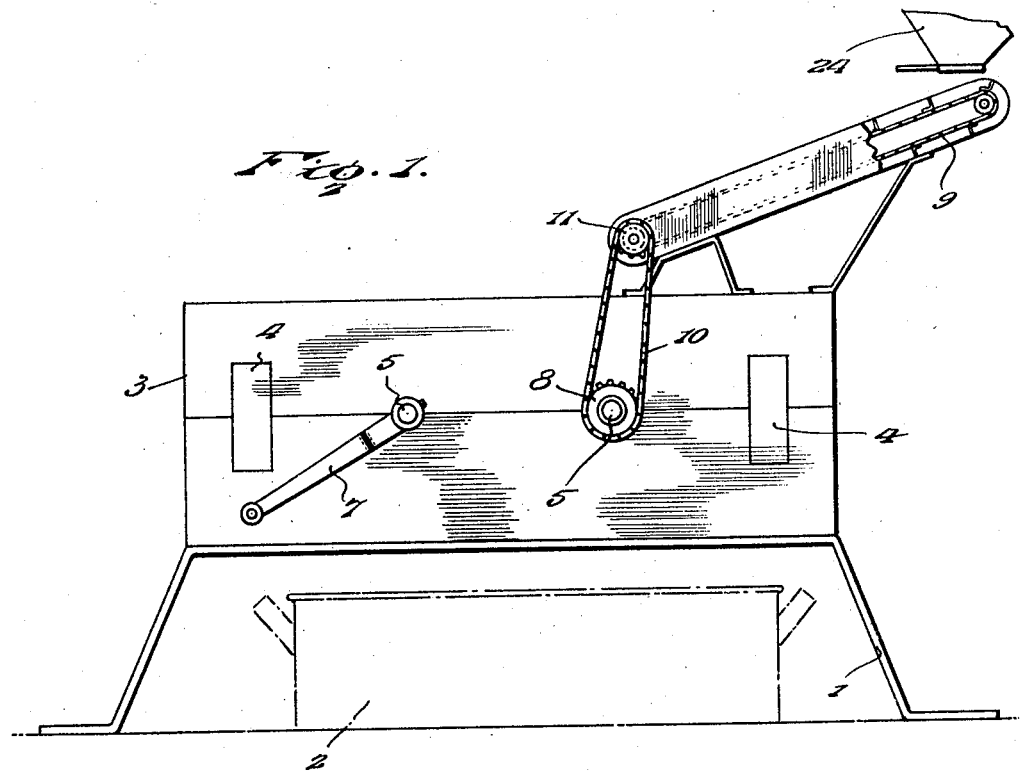
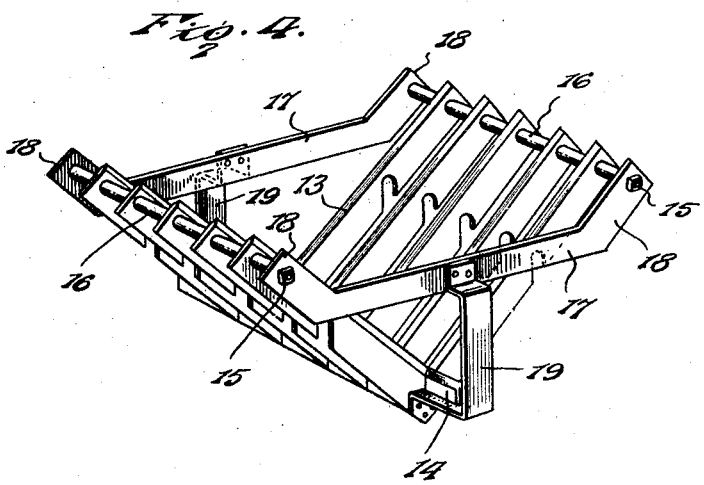
Inventor
Preston Fowler.
By Lacey & Lacey, Attorney.

Aug. 27, 1929.  P. FOWLER  1,726,145
POTATO SEED CUTTER
Filed June 20, 1928    2 Sheets-Sheet 2
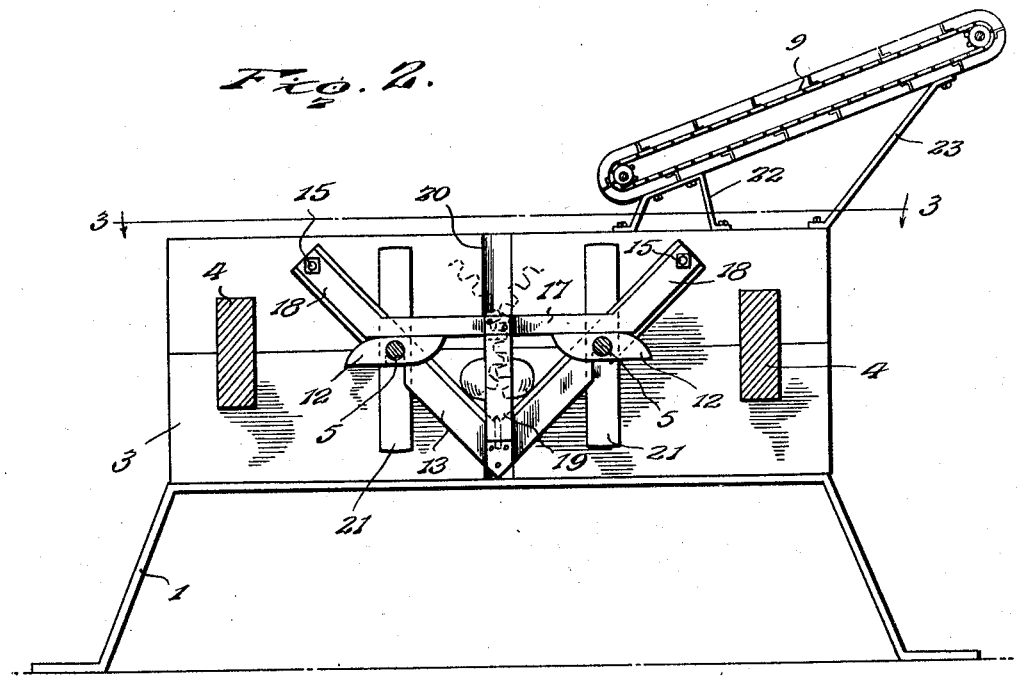
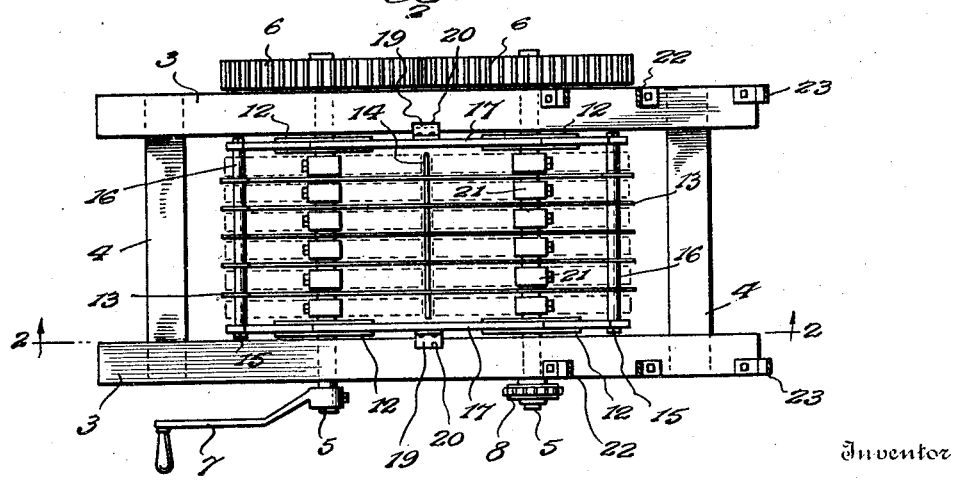
Inventor
Preston Fowler.
By Lacey & Lacey, Attorney.

Patented Aug. 27, 1929.

1,726,145

UNITED STATES PATENT OFFICE.

PRESTON FOWLER, OF GORDON, NEBRASKA.

POTATO-SEED CUTTER.

Application filed June 20, 1928. Serial No. 286,793.

The invention provides a machine for rapidly and effectively cutting potatoes into pieces suitable for planting as seed and including a feeder to supply the potatoes to the cutting mechanism in a manner to prevent choking.

The machine includes a bank of cutters, a gang of pressures members, means for independently moving the cutters and pressure members, and a feeder for advancing the potatoes at regular and proper intervals.

While the drawing illustrates a preferred embodiment of the invention, it is to be understood that in adapting the means to meet specific needs and requirements, the design may be varied and such other changes in the minor details of the invention as claimed, without departing from the spirit thereof.

For a full understanding of the invention and the merits thereof, reference is to be had to the following description and the drawing hereto attached in which:—

Figure 1 is a side view of a potato seed cutting machine embodying the invention, a portion of the hopper and feeder being broken away.

Figure 2 is a vertical longitudinal sectional view on the line 2—2 of Figure 3 looking in the direction of the arrows.

Figure 3 is a top plan view, the support for the feeder being in section on the line 3—3 of Figure 2.

Figure 4 is a detail perspective view of the cutting mechanism.

Corresponding and like parts are referred to in the following description and designated in the several views of the drawings by like reference characters.

The machine includes a suitable frame work for receiving and supporting the operating parts. For convenience the frame work is mounted upon a stand 1 so that a receptacle 2 may be positioned thereunder for receiving the cut pieces of the potatoes which constitute the seed for planting.

As indicated the frame work is rectangular and opens at the top and bottom for reception and discharge of the potatoes. The frame work comprises parallel sides 3 and end cross piece 4 connecting the sides. Two transverse shafts 5 are mounted in the sides 3 of the frame work in parallel relation and their ends project. Companion gear wheels 6 of like diameter and formed with an equal number of teeth are secured to the projecting ends of the shaft 5 at one side of the machine as indicated most clearly in Figure 3 of the drawings. A crank 7 is fast to a projecting end of one of the shafts 5 at the opposite side of the machine and provides convenient means for operation. A sprocket wheel 8 is fast to the projecting end of the other shaft 5 on the same side of the machine as the crank 7. Power is taken from the sprocket wheel 8 for operating the feeder 10 by means of a sprocket chain 9 which passes around the sprocket wheel 8 and a companion sprocket wheel 11 fast to a shaft of the feeder. Cams or lifters 12 are fastened to opposite end portions of each of the shafts 5 and are disposed adjacent the inner faces of the sides 3. These cams operate to elevate the cutting mechanism in the operation of the machine.

The cutting mechanism comprises a bank of cutters which are connected to move as a unit. The cutters are designated by the numeral 13 and are substantially of V-form.

A transverse cutter 14 extends between the sides 3 and is located in the angle formed between the elements comprising parts of the cutters 13. The transverse cutter 14 functions to halve the potatoes, whereas the cutters 13 slice the potatoes into pieces of suitable size. Tie rods 15 connect the cutters 13 and receive spacers 16 for maintaining the cutters the proper distance apart. A bar is provided at each side of the bank of cutters 13 and includes a longitudinal portion 17 and oppositely inclined end portion 18 which are separated to receive the ends of the tie rods 15. The longitudinal portions 17 of the side bars are positioned above the cams or lifters 12 to be engaged thereby for elevating the banks of cutters when the machine is in operation. Vertical guide bars 19 are located at opposite sides of the bank of cutters and direct the same in their vertical movements. Vertical guide grooves 20 are formed in the inner faces of the side 3 and receive the guide bars 19 and coact therewith to maintain the cutting mechanism in predetermined position at all stages of their vertical movement. Opposite end portions of the guide bars 19 are off-set inwardly and are secured to the part 17 of the side bars and the lower ends of the extreme cutters 13, as shown most clearly in Figure 4 of the drawings.

Pressure members 21 cooperate with the cutting mechanism and consist of bars which are mounted upon the respective shafts 5 and are fast thereto for rotation therewith. The bars 21 are of a length to clear one another when their inner ends occupy a horizontal position. The pressure members 21 coact with the bank of cutters to press the potatoes therethrough. A gang of pressure members cooperates with the elements of the bank of cutters and the parts are so positioned that when the cutting mechanism is at its lowest position the pressure members 21 are vertically disposed. As the cutting mechanism rises under the action of the cams or lifters 12 the upper ends of the pressure members move inward and downward and sweep through the spaces formed between the cutters 13 and press the pieces of the cut potato through such spaces and clear of the machine. When the inwardly and downwardly moving ends of the pressure members, or bars 21, reach an approximate horizontal position a potato is delivered thereon by means of the feeder 9 and moves downwardly with said ends and finally is received in the angular space formed between the oppositely inclined blades or knives of the cutters. The cutting mechanism then begins to rise and at the same time the upper ends of the pressure members 21 move inwardly and downwardly and engage the potato and press it through the spaces formed between the cutters 13, said potato being cut in half by means of the transverse blade 14 and sliced into pieces by means of the cutters 13.

The feeder is elevated and supported upon an end portion of the frame work by suitable standard 22 and 23 and consist of an endless carrier provided with lags between which the potatoes are received from the hopper 24 and advanced and dropped upon the inner ends of the pressure members 21 in the manner stated.

Having thus described the invention, I claim:—

1. The combination with a cutting mechanism comprising spaced cutters, of a pressure mechanism including spaced members disposed to rotate in the spaces formed between the elements of the cutting mechanism, and means for reciprocating the cutting mechanism during rotation of the members of the pressure mechanism.

2. The combination with a bank of substantially V-shaped cutters and means for imparting a reciprocatory movement to the bank of cutters, of gangs of pressure members disposed to cooperate with the elements comprising the cutters.

3. The combination with a bank of substantially V-shaped cutters, and means for raising and lowering the bank of cutters, and of gangs of rotary pressure members disposed to cooperate with the elements comprising the bank of cutters.

4. The combination with a bank of V-shaped cutters, spaced parallel shafts and lifters on the shafts for effecting a vertical movement of the bank of cutters, of pressure members on each of the shafts and adapted to cooperate with the bank of cutters.

5. The combination with a bank of V-shaped cutters, spaced parallel shafts and lifters on the shafts for effecting a vertical movement of the bank of cutters, of pressure members rotatable with the shafts and adapted to cooperate with the bank of cutters, and comprising spaced bars arranged to have their upper ends travel inwardly and downwardly simultaneously with the upward movement of the bank of cutters.

In testimony whereof I affix my signature.

PRESTON FOWLER.